United States Patent [19]
Leyden et al.

[11] Patent Number: 6,039,498
[45] Date of Patent: Mar. 21, 2000

[54] SECURITY SYSTEM

[75] Inventors: Roger Leyden, Willow Springs; Terrance Surma, Bloomingdale, both of Ill.

[73] Assignee: Se-Kure Controls, Inc., Franklin Park, Ill.

[21] Appl. No.: 09/094,131

[22] Filed: Jun. 9, 1998

[51] Int. Cl.[7] .................................................. E05B 73/00
[52] U.S. Cl. ......................... 403/61; 403/315; 403/291; 248/551; 70/58; 340/568
[58] Field of Search .................................. 70/18, 30, 49, 70/58; 248/177.1, 178.1, 179.1, 551, 552; 340/568.1, 568.2, 568.4, 427, 549, 548; 403/61, 116, 291, 315, 405.1, 406.1; 396/421, 405.1, 406.1

[56] References Cited

U.S. PATENT DOCUMENTS

| | | | |
|---|---|---|---|
| 2,735,702 | 2/1956 | Larson | 403/61 |
| 3,791,096 | 2/1974 | Epperlein | 403/315 |
| 4,066,231 | 1/1978 | Bahner et al. | 248/552 |
| 4,550,893 | 11/1985 | Wiersema et al. | 248/222.4 |
| 4,911,348 | 3/1990 | Rasor et al. | 403/61 X |
| 4,955,743 | 9/1990 | King | 403/254 |
| 5,083,147 | 1/1992 | Nakatani | 248/179.1 |
| 5,119,203 | 6/1992 | Hosaka et al. | 248/179.1 X |
| 5,146,205 | 9/1992 | Keifer et al. | 340/568.2 |
| 5,341,124 | 8/1994 | Leyden et al. | 340/568.4 |
| 5,421,667 | 6/1995 | Leyden et al. | 403/291 X |
| 5,444,507 | 8/1995 | Palmer | 396/421 X |
| 5,624,045 | 4/1997 | Highsmith et al. | 403/315 X |

*Primary Examiner*—Lynne H. Browne
*Assistant Examiner*—John R. Cottingham
*Attorney, Agent, or Firm*—Wood, Phillips, VanSanten, Clark & Mortimer

[57] ABSTRACT

A security assembly for an article to be monitored. The security assembly has a plate assembly with a first surface facing in a first direction for placement against one surface on an article to be monitored and a second surface facing transversely to the first direction for placement against another surface on an article to be monitored. A fastener maintains the security assembly operatively connected to an article to be monitored.

27 Claims, 4 Drawing Sheets

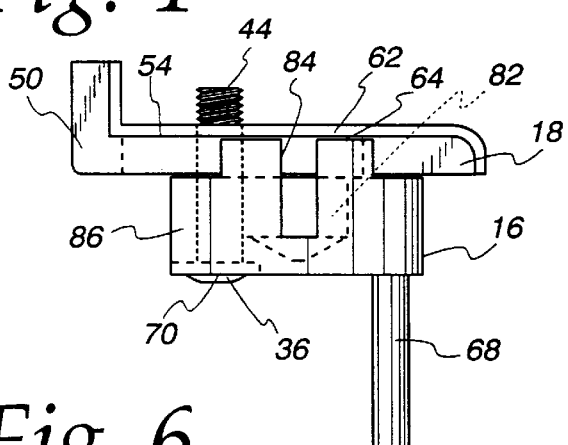
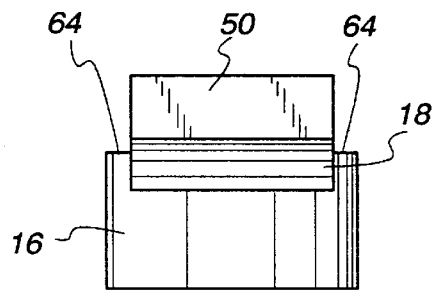
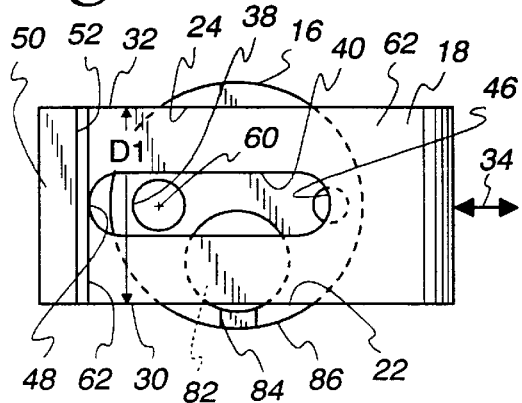
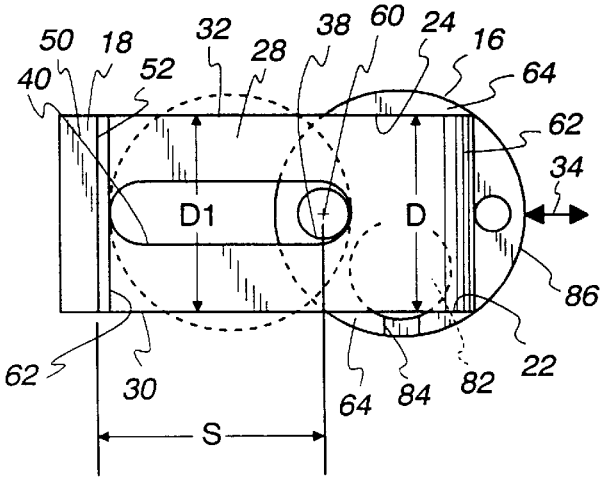
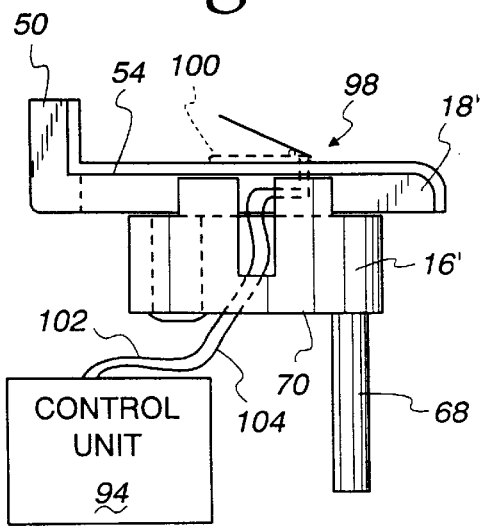

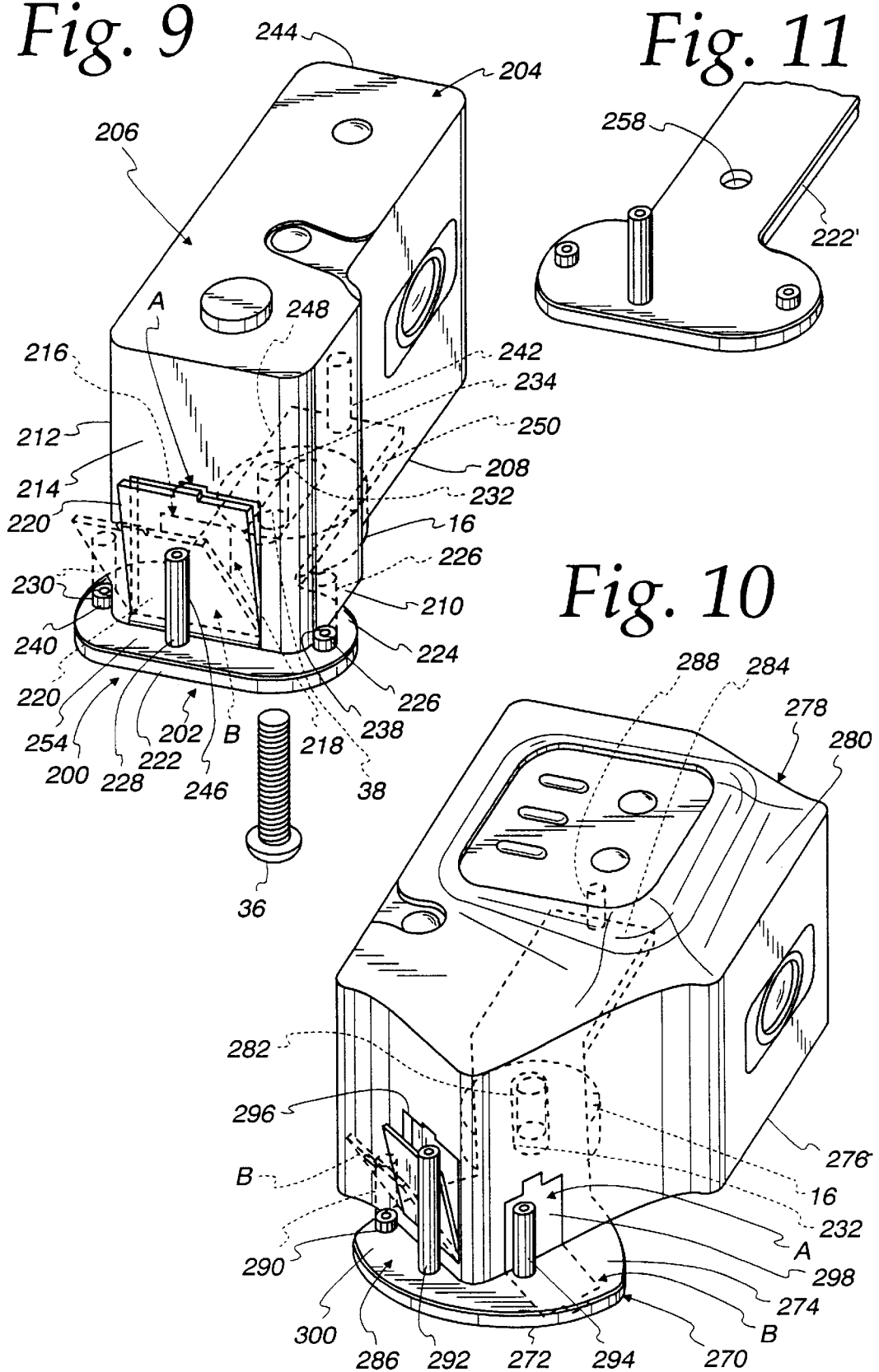

SECURITY SYSTEM

BACKGROUND OF THE INVENTION

1. Field of the Invention

This invention relates to security systems of the type used to prevent the unauthorized removal of an article from a prescribed area.

2. Background Art

Consumer electronic stores typically display a large number of products so as to allow a potential purchaser thereof to pick the products up, inspect them, and potentially effect, or simulate, operation thereof. In large display rooms, particularly at times when large numbers of people are present, the potential for theft is heightened. This problem is particularly significant with camera displays. Still and video cameras are becoming ever smaller and lighter in weight. While these features make the cameras more desirable to the consumer, they at the same time make them more prone to theft.

The assignee herein offers a number of products which are used to avoid theft of articles, such as cameras. In U.S. Pat. No. 5,421,667, a mechanical security system is shown utilizing a block/housing which is attached to an article with a bolt using a preexisting, threaded bore in an article to be monitored. The block/housing is used to fixedly maintain one end of a cable tether on the article. The other end of the cable tether is anchored to a support at the desired display area. This type of mechanical system, while generally highly effective, can be defeated if the cable tether is severed or the block/housing is removed from the article. In certain constructions, the latter can be accomplished by directly rotating the bolt to effect release thereof, or by rotating the bolt indirectly by turning the block/housing through which the bolt extends.

This system may also incorporate an elongate pin which is offset from the bolt axis and projects from the block/housing into the article. This avoids rotation of the block/housing. However, this system might be defeated by using a tool to exert a substantial torque on the block/housing which effects shearing of the offset pin to thereafter allow turning of the block/housing.

The problem of cable severance has been addressed by other systems developed by the assignee herein. For example, in U.S. Pat. No. 5,341,124, an electronic security system is disclosed which produces an audible and visual alarm as an incident of either a) the block/housing being removed from the article being monitored or b) the conductive tether, which establishes a conductive path between the article and an alarm, being severed.

The above systems have been highly commercially successful and highly effective in deterring theft. However, even if the system is not defeated, attempted removal of the block/housing by rotating the securing bolt through manipulation of the block/housing may inflict damage to oft times expensive products.

Further, a failure in a system may be the result of a selection of a system type that is not optimal for the environment. The electronic security systems are generally more expensive than the mechanical security systems and may not fit within the budget constraints of certain businesses. As a result, some users may opt to use a mechanical system alone that may not be as effective as one incorporating an electronic monitoring capability.

The above problem has become particularly prevalent with the development of more and more products that are small, yet expensive, such as digital cameras. Digital cameras present an additional security consideration by reason of having removable parts that are themselves expensive. For example, it is common to incorporate small memory cards into the camera and to permit loading and unloading of the cards through a repositionable element on the camera case. Typically, the repositionable element is a door that is hinged for pivoting movement about an axis between open and closed positions. While the case of a camera may be secured using the above structures, the doors themselves remain exposed and operable, thereby allowing the thief access to the memory card.

SUMMARY OF THE INVENTION

In one form of the invention, a security assembly is provided for an article to be monitored. The security assembly has a plate assembly with a first surface facing in a first direction for placement against one surface on an article to be monitored and a second surface facing transversely to the first direction for placement against another surface on an article to be monitored. A fastener maintains the security assembly operatively connected to an article to be monitored.

The plate assembly may include a plate defining the first surface.

The second surface may be defined by a first post projecting in cantilever fashion from the plate.

The first post may be formed separately from the plate and attached to the plate as by a press fit operation.

A second post may be provided spaced from the first post and projecting in cantilever fashion from the plate. The second post defines a third surface for placement against a surface on an article to be monitored.

A block/housing may be provided which can be held by the fastener in an operative position on an article to be monitored with the plate captive between the block/housing and an article to be monitored.

The mounting post may project in cantilever fashion from the block/housing to engage a mounting base.

In one form, the first post and mounting post project oppositely with the block/housing in the operative position on an article to be monitored and the plate captive between the block/housing and an article to be monitored.

A resilient material may be provided on the plate between the first surface and the one surface on an article to be monitored with the security assembly operatively connected to an article to be monitored.

The fastener may be a threaded element.

In one form, the block/housing and plate each have an opening extending therethrough to receive the fastener.

In one form, the opening in at least one of the block/housing and plate is elongate to allow the block/housing and plate to be relatively moved between first and second positions with the fastener extending through the openings.

The invention also contemplates the combination of a) an article to be monitored having one surface and another surface that is transverse to the one surface, and b) a security assembly. The security assembly has a plate assembly having a first surface facing in a first direction and abutting to the one surface on the article to be monitored and a second surface facing transversely to the first direction and abuttable to the another surface of the article to be monitored. The fastener maintains the security assembly operatively connected to the article to be monitored.

In one form, the article to be monitored has a repositionable element that is movable selectively between first and second positions. With the security assembly operatively connected to the article to be monitored, the second surface blocks movement of the repositionable element from the first position into the second position.

The repositionable element may be a door that is pivotable between the first and second positions.

In one form, the article to be monitored is a camera.

The camera may have a threaded bore therein with the fastener threadably engaged with the camera bore.

BRIEF DESCRIPTION OF THE DRAWINGS

FIG. 4 is a side elevation view of the inventive security assembly;

FIG. 5 is an end elevation view of the security assembly of FIG. 4;

FIG. 6 is a plan view of the security assembly of FIGS. 4 and 5;

FIG. 7 is a view as in FIG. 6 with the housing and stabilizing element on the security assembly in two different relative positions;

FIG. 8 is a side elevation view of a modified form of security assembly according to the present invention with a modified form of electrical monitoring capability incorporated therein;

FIG. 9 is a perspective view of a digital camera with a modified form of security assembly, according to the present invention, operatively connected thereto;

FIG. 10 is a view as in FIG. 9 of another form of camera and a further variation of a security assembly, according to the present invention;

FIG. 11 is a fragmentary, perspective view of a plate, as on the security assemblies in FIGS. 9 and 10, and slightly modified therefrom.

DETAILED DESCRIPTION OF THE DRAWINGS

Figure 1:
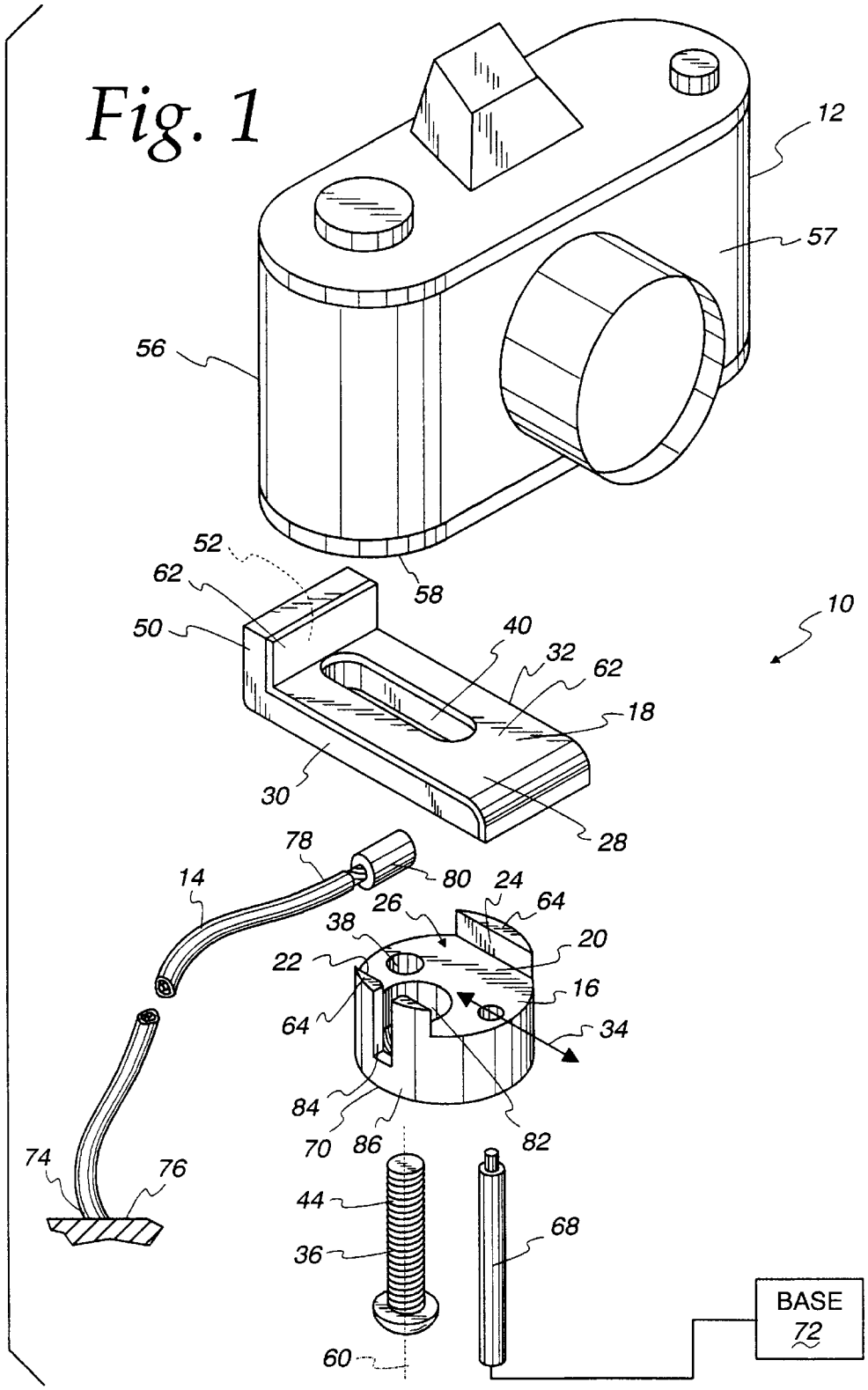
FIG. 1 is a exploded perspective view of a security system, according to the present invention, including a security assembly for monitoring, in this case, a camera.

Referring initially to FIGS. 1, 2 and 4–7, a security assembly, according to the present invention, is shown at 10. The security assembly 10 is a mechanical-type system which is designed to monitor a portable article, in this case a camera 12. The security assembly 10 and camera 12 together define a security system. The security assembly 10 can be used to monitor any type of article to be maintained within a prescribed range as determined by an elongate, flexible tether 14.

The security assembly 10 includes a disk-shaped block/housing 16 and an L-shaped stabilizing element 18. The housing 16 has an undercut, upwardly facing surface 20. The undercut produces two diametrically opposite, spaced, facing surfaces 22, 24 which, in conjunction with the surface 20, define an upwardly opening, U-shaped receptacle at 26 for the stabilizing element 18. The surfaces 22, 24 are substantially flat and parallel to each other and spaced by a distance D. The stabilizing element 18 has a rectangular body 28 with two parallel edges 30, 32 spaced from each other a distance D1, that is slightly less than the distance D, so that the housing 16 and stabilizing element 18, through the surfaces 22, 24 and edges 30, 32 are guidable one against the other in the line of the double-headed arrow 34.

Figure 2:
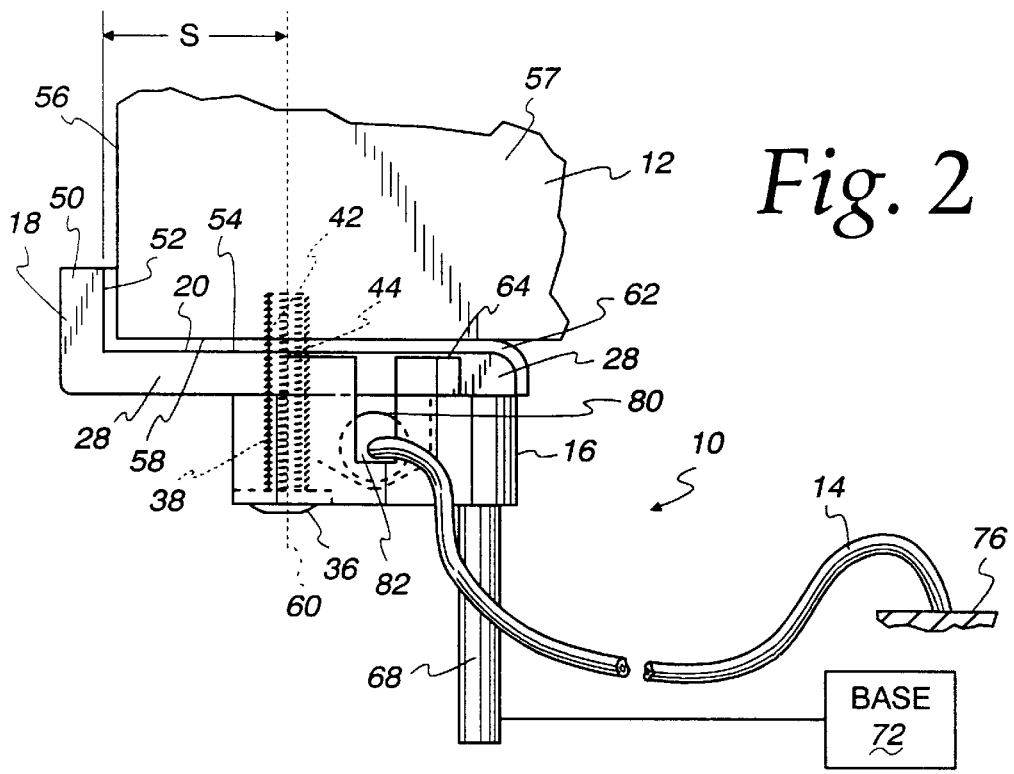
FIG. 2 is a fragmentary, side elevation view of the security system in FIG. 1 with a housing and stabilizing element on the security assembly in an operative position on the camera.

To place and maintain the housing 16 and stabilizing element 18 in an operative position on the camera 12, as shown in FIG. 2, a threaded fastener 36 is employed. The fastener 36 is extended upwardly through an opening/bore 38 through the housing 16, through an elongate opening/slot 40 through the stabilizing element body 28, and into a threaded, blind bore 42 in the camera 12. The major axis of the slot 40 is substantially parallel to the edges 30, 32 so that a threaded shank 44 on the fastener 36 moves guidingly within the slot 40 as the housing 16 and stabilizing element 18 are relatively repositioned in the line of the double-headed arrow 34. The housing 16 and stabilizing element 18 are thus relatively repositionable between a) a first position, shown in solid lines in FIG. 7, wherein the fastener shank 44 abuts to an edge 46 at one end of the slot 40 and b) a second position wherein the fastener shank 44 abuts to an edge 48 at the opposite end of the slot 40.

The body 28 has an upstanding wall 50 which defines a flat shoulder 52 that is substantially perpendicular to an upwardly facing, flat, article support surface 54 on the body 28. The shoulder 52 and surface 54 cooperatively define an L-shaped seat for the article to be monitored, in this case the camera 12. The shoulder 52 is designed to be abuttable to one surface 56 on the camera case 57, with the surface 54 designed to be abutted to a transverse surface 58 on the case 57.

With the fastener 36 extended through the housing 16 and stabilizing element 18, the shoulder 52 faces the central axis 60 of the fastener 36. A spacing S between the shoulder 52 and the fastener axis 60 is variable by relatively repositioning the housing 16 and stabilizing element 18 between the first and second relative positions therefor. With this arrangement, a universal construction for the housing 16 and stabilizing element can be used and will accommodate a range of different article configurations. For example, in FIG. 3, a camera 12' is shown wherein a blind bore 42', corresponding to the bore 42, is closer to the rear camera surface 56' than the bore 42 is to the corresponding rear surface 56 on the camera 12 in FIG. 2. With the adjustment capability, the shoulder 52 can be directly abutted to each of the rear camera surfaces 56, 56'. While direct abutment is not required, the shoulder 52 should be sufficiently close to the surfaces 56, 56' that the wall 50 will abut to the camera surface 56, 56' if an attempt is made to rotate the fastener 36 by manipulation of the housing 16 and stabilizing element 18.

To avoid damage to the article 12, 12' being monitored, a resilient layer 62, made of rubber, or the like, may be disposed over the shoulder 52 and surface 54 to both act as a cushion between the stabilizing element 18 and the article 12, 12' and increase the coefficient of friction between the housing 16 and stabilizing element 18 and the article 12, 12' with the stabilizing element 18 drawn positively against the article 12, 12' through the fastener 36.

Preferably, the upper edges 64 of the housing 16 do not extend upwardly to the height of the surface 54 and the stabilizing element 18. This avoids potential marring of the article 12, 12' by the edges 64 with the housing 16 and stabilizing element 18 in the operative position on the article being monitored.

A mounting post 68 projects in cantilever fashion from the underside 70 of the housing 16. The mounting post 68 can be placed in a receptacle on a pedestal or other type of mounting base 72 to thereby maintain the article 12, 12', with the housing 16 and stabilizing element 18 in an operative position thereon, in an upright and readily accessible position to be handled by a potential purchaser.

To secure the article 12, 12' and security assembly 10 at a desired location, a mechanical arrangement is shown in FIGS. 1 and 2. The tether 14 may be an elongate, flexible, metal cable with a first end 74 that is anchored to a base 76 and a second end 78 with an enlargement 80 thereon. The enlargement 80 may be a metal element that is crimped onto the tether cable 14.

The housing 16 has a cavity 82 formed through the surface 20. The cavity 82 can be formed by a blind bore. A slot 84 is formed in the peripheral wall 86 at the housing 16 to accept the cable diameter on the tether 14. This allows introduction of the enlargement 80 into the cavity 82. The slot 84 has a circumferential width that is small enough that it will not allow passage therethrough of the enlargement 80. With this arrangement, the enlargement 80 can be directed into the cavity 82 as the tether cable 14 is advanced downwardly through the slot 84. With the stabilizing element 18 in place within the receptacle 26, the stabilizing element 18 blocks the enlargement 80 within the cavity 82 with the housing 16 and stabilizing element 18 in both the first and second relative positions, as previously described.

Figure 3:
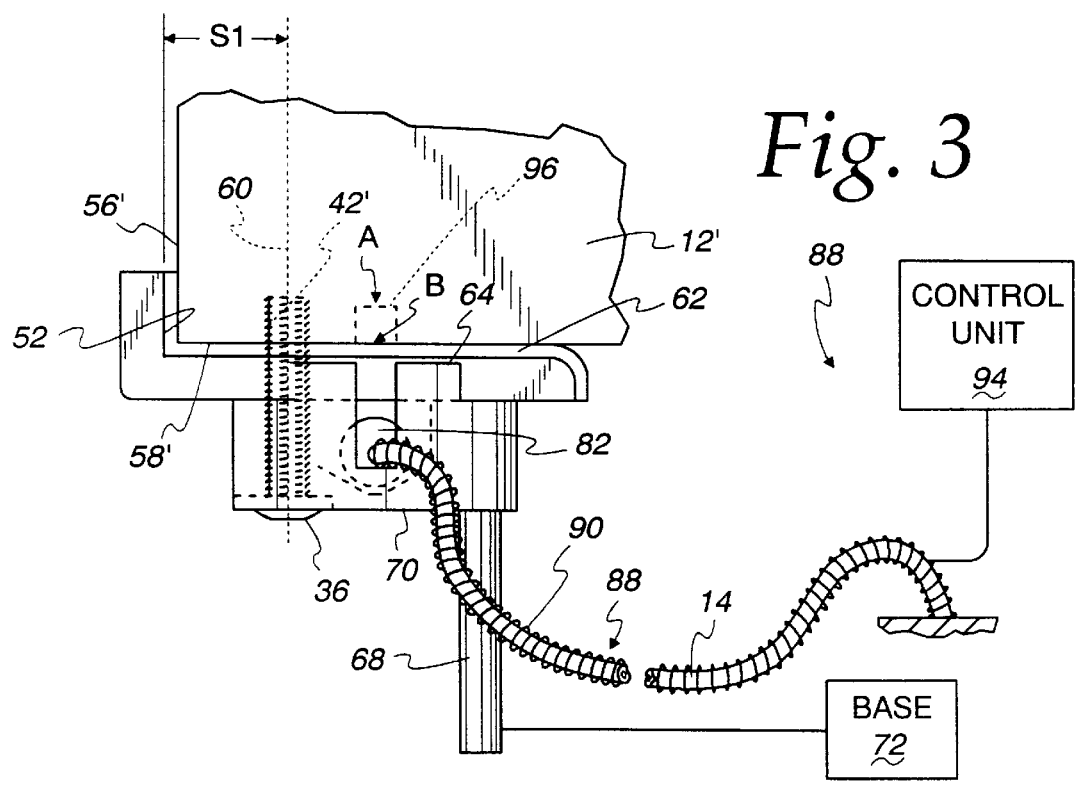
FIG. 3 is a view as in FIG. 2 with the security assembly configured to have both a mechanical and electrical monitoring capability.

In FIG. 3, a modification is shown wherein the tether 14 is assembled as in FIGS. 1 and 2 and with the mechanical tether 14 supplemented by an electrical security assembly 88. The security assembly at 88 includes a conductive element 90 that is wrapped around the tether cable 14 and defines a plurality of conductive paths between the housing 16 and a control unit 94. A conventional type button 96 is depressible from the position shown at A to a position shown at B as it is pressed upwardly against the article 12'. As the button 96 moves from the B position to the A position, there is break in at least one conductive path which is sensed by the control unit 94, which produces an audible and/or visual alarm. The alarm would be activated in the event that the article 12' was removed from the security assembly 88, as a result of which the button 96 would move from the B position to the A position, or in the event that the conductor 90 was severed.

In FIG. 8, a further modified form of security system, according to the present invention, is shown at 98. The system 98 uses only an electrical monitoring. In this case, a switch 100 is movable between first and second states, as shown in solid lines and dotted lines in FIG. 8. In the first state, the system is deactivated, i.e. a conductive path defined by at least one of two conductors 102, 104 is broken. By movement to the phantom line position, the conductive path is established, which occurs as a result of the housing 16' and stabilizing element 18' being mounted in the operative position to the article 12, 12'.

Accordingly, the invention contemplates the use of strictly mechanical, electrical, or a combination of electrical/mechanical monitoring.

In FIGS. 9–11, modified forms of security assemblies are shown. Referring initially to FIG. 9, one modified form of security assembly, according to the present invention, is shown at 200. The security assembly 200 consists of the aforementioned block/housing 16 and a cooperating stabilizing element/plate assembly 202, hereinafter referred to as the plate assembly 202. The security assembly 200 functions in the same manner as the security assemblies described above with respect to FIGS. 1–8, with the exception that the plate assembly 202 has a different configuration than the corresponding stabilizing element 18. The block/housing 16 in FIG. 9 functions in the same manner as previously described with respect to FIGS. 1–8, i.e. to connect to the article to be monitored, the tether 14, the base 72, and control unit 94. The switch 100, previously described can be incorporated into the plate assembly 202 in the same manner as it is incorporated into the stabilizing element 18' of FIG. 8.

More specifically, the plate assembly 202 is configured to adapt to, in this case, a digital camera 204 of a conventional construction. The digital camera 204 has a case 206 with a flat, bottom, external surface 208, and generally flat front, rear, and side, external surfaces 210, 212, 214 that are each transverse to the bottom surface 208.

This particular camera 204 has a receptacle 216 for a conventional memory card 218 which controls certain functions of the camera 204. The memory card 218 has a conventional construction and is accessible through a repositionable element/door 220 which is hinged to the case 206 for pivoting movement between a first/closed position, at A, and a second/open position, at B. By pivoting the door 220 to the open position, the memory card 218 can be accessed to be removed from the receptacle 218. The plate assembly 202 prevents the door 220 from moving from the closed position fully into the open position as would allow the memory card 218 to be removed, as by a thief. The door 220, or other doors may confine other components such as batteries which may likewise be expensive and a target for thieves.

More particularly, the plate assembly 202 consists of a flat plate 222 defining an upwardly facing surface 224 which is flat and attached to the bottom surface 208 of the case 206. The plate assembly 202 further has, in this particular embodiment, three posts 226, 228, 230 projecting in cantilever fashion upwardly from the plate 222. The posts 226, 230 are abuttable to the front surface 210 and rear surface 212, respectively. With the fastener 36 extending upwardly through the opening/bore 38 in the block/housing 16 and an opening 232 through the plate 222 and into a threaded blind bore 234 in the camera 204, the fastener 36 maintains the security assembly 200 operatively connected to the camera 204. With the block/housing 16 operatively connected to the case 206 through the fastener 36, the plate 222 becomes captive between the case 206 and block/housing 16. If a would be thief attempts to rotate the fastener 36 with the security assembly 200 operatively connected to the camera 204 by manipulating the plate 222, in the event of a right-handed screw, a peripheral surface 238 on the post 226 abuts to the front surface 210. In the event of a left-handed fastener 36, a peripheral surface 240 on the post 230 abuts to the rear surface 212 of the case 206 to prevent rotation thereof through manipulation of the plate 222. An optional post 242 projects in cantilever fashion from the plate 222 adjacent to the side surface 244 of the camera case 206 that faces oppositely to the side surface 214.

The post 228 is strategically located so that a peripheral surface 246 thereon abuts to the door 220 in the event that the door 220 is manipulated to be moved from the closed position into the open position therefor. Other posts can be provided to block any other region of the camera case 206 in like fashion.

In this embodiment, the opening 232 through the plate 222 is elongate to allow the housing 16 and plate 222 to be guidingly moved relative to each other between first and second positions. The plate 222 has oppositely facing surfaces 248, 250 which cooperate with facing surfaces 22, 24 on the housing 16 to guide translatory movement of the housing 16 and plate assembly 202. The degree of relative movement is dictated by the length of the opening/elongate slot 232. With this arrangement, the user can direct the fastener 36 through the housing 16 and plate 222 and into the blind bore 234 in the camera case 206. The user can then shift the plate 222 relative to the housing 16 to optimally position the posts 226, 228, 230 to both prevent relative rotation between the plate 222 and camera case 206 about the axis of the fastener 36 and block the opening movement of the door 220. With the plate 222 in the desired position, the fastener 36 can be tightened to releasably fix the relative positions of the housing 16, plate 222 and camera case 206, as previously described for the embodiments in FIGS. 1–8.

While it is described that the posts 226, 228, 230, 242 abut to the camera case 206, it is contemplated that these posts 226, 228, 230, 242 could be slightly spaced from the camera case 206 to be abuttable directly thereto in the event that the case 206 and plate 224 are relatively moved, or the door 220 is moved relative to the case 206.

The posts 226, 230 are shown to have a relatively low profile in solid lines. Each of the posts 226, 230 can be extended upwardly further, as shown in dotted lines, for additional security, i.e. to prevent relative movement of the case and the post 226, 230 as would permit release of the fastener 36.

A layer of resilient material 254, of the type previously described, may be applied over the plate 222 to prevent damage to the camera case 206 and also to increase the coefficient of friction between the plate 222 and case 206. With this arrangement, the plate 222 is indirectly abutted to the camera case 206.

The posts 226, 228, 230, 242 can be separately formed from the plate 222 and press fit thereto for ease of manufacture. Split hollow pins can be used for the posts 226, 228, 230, 242. An optional resilient coating can be applied to the posts 226, 228, 230, and 242 to prevent damage to the camera case 206 at any contact regions.

In FIG. 11, a slightly modified form of the plate 222 is shown at 222'. The only difference between the plate 222' and the plate 222 is that the plate 222' has a round opening 258 therethrough as opposed to the elongate, oval arrangement for the opening 232 in the plate 222. Accordingly, the lateral position of the plate 222' relative to the camera 204 remains substantially fixed.

In FIG. 10, a modified form of stabilizing element/plate assembly is shown at 270. The plate assembly 270 has a plate 272 with a surface 274 that is attached to the bottom surface 276 of the camera 278. Whereas the plate 22 has a generally T-shaped configuration, the plate 272 has a generally S-shaped configuration. The particular configuration of the plate 222, 272 is dictated by the shape of the camera case 280. In this case, the S-shaped plate 272 allows the fastener 36 to be directed into a blind bore 282 in the camera case 280 to define projecting post support sections 284, 286 at the sides of the camera. The post support section 284 serves as a foundation for a post 288 projecting in cantilever fashion upwardly therefrom. At the post support section 286, three posts 290, 292, 294 are mounted, each projecting upwardly in cantilever fashion from the plate 272. The post 290, which may have a low profile, as shown in solid lines, or a longer projection, as shown in dotted lines, primarily serves to prevent relative rotation between the plate 272 and camera case 280 around the axis of the fastener 236 with the security assembly operatively connected to the camera 278.

The posts 292, 294 are strategically located to prevent movement of repositionable elements/doors 296, 298 from the closed position therefor into an open position, shown in Figs. A and B for each of the doors 296, 298. A resilient material 300 can be applied over the plate 272 to protect the camera case 280 from scratching or denting.

Using this basic concept, a plate can be shaped to fit virtually any configuration of camera, or other type of article to be monitored. It should be understood that the description of a camera as the article being monitored is but exemplary of virtually an infinite number of articles that could be monitored using the inventive concept. By strategically locating posts to project in cantilever fashion up away from the plates, relative rotation of the plates and article being monitored can be limited while at the same time allowing each post to block movement of a repositionable element on the article being monitored.

As described with respect to FIGS. 1–8, the plates can be incorporated into a system for monitoring either mechanically, electrically, or using a combination of electrical and mechanical monitoring.

The foregoing disclosure of specific embodiments is intended to be illustrative of the broad concepts comprehended by the invention.

We claim:

1. A security apparatus for an article to be monitored, said security apparatus comprising:

a) a security assembly comprising:
      a plate assembly having a first surface facing in a first direction for placement against one surface on an article to be monitored, a first post projecting from the plate and defining a second surface facing transversely to the first direction for placement against another surface on an article to be monitored, and a second post projecting from the plate and defining a third surface for placement against a surface on an article to be monitored; and
      a fastener for maintaining the security assembly operatively connected to an article to be monitored; and
   b) an elongate flexible cable connected to and extending from the plate assembly usable to monitor an article to which the security assembly is operationally connected.

2. The security apparatus according to claim 1 wherein the plate assembly comprises a plate defining the first surface.

3. The security apparatus according to claim 2 wherein the first post projects in cantilever fashion from the plate.

4. The security apparatus according to claim 3 wherein the first post is formed separately from the plate and attached to the plate.

5. The security apparatus according to claim 4 wherein the first post is press fit to the plate.

6. The security apparatus according to claim 3 wherein the second post is spaced from the first post and projects in cantilever fashion from the plate.

7. The security apparatus according to claim 2 further comprising a block/housing which can be held by the fastener in an operative position on an article to be monitored with the plate captive between the block/housing and an article to be monitored.

8. The security apparatus according to claim 7 further comprising a mounting post projecting in cantilever fashion from the block/housing to engage a mounting base.

9. The security apparatus according to claim 8 wherein the first post and mounting post project oppositely with the block/housing in the operative position on an article to be monitored and the plate captive between the block/housing and an article to be monitored.

10. The security apparatus according to claim 2 wherein there is a resilient material on the plate between the first surface and the one surface on an article to be monitored with the security assembly operatively connected to an article to be monitored.

11. The security apparatus according to claim 1 wherein the fastener is a threaded element.

12. The security apparatus according to claim 7 wherein the block/housing and plate each have an opening therethrough to receive the fastener.

13. The security apparatus according to claim 12 wherein the fastener is elongate and has a central axis, the opening in at least one of the block/housing and plate is elongate, and the fastener is movable within the opening transversely to the central axis of the fastener to allow the block/housing and plate to be relatively moved between first and second positions with the fastener extending through the openings.

14. In combination:
a) an article to be monitored having one external surface, another external surface that is transverse to the one surface, and a third surface; and
b) a security assembly comprising:
a plate assembly having a first surface facing in a first direction and abutting to the one external surface on the article to be monitored, a second surface facing transversely to the first direction and abutting to the another external surface of the article to be monitored, and a third surface facing transversely to the first direction and abutting to the third surface on the article;
a fastener for maintaining the security assembly operatively connected to the article to be monitored; and
an elongate, flexible cable connected to and extending from the plate assembly usable to monitor the article.

15. In combination:
a) an article to be monitored having one external surface, another external surface that is transverse to the one surface, and a third surface; and
b) a security assembly comprising:
a plate assembly having a first surface facing in a first direction and abutting to the one external surface on the article to be monitored, a second surface facing transversely to the first direction and abutting to the another external surface of the article to be monitored, and a third surface facing transversely to the first direction and abutting to the third surface on the article; and
a fastener for maintaining the security assembly operatively connected to the article to be monitored,
wherein the article to be monitored has a repositionable element that is movable selectively between first and second positions, and with the security assembly operatively connected to the article to be monitored, the second surface blocks movement of the repositionable element from the first position into the second position.

16. The combination according to claim 15 wherein the repositionable element is a door that is pivotable between the first and second positions.

17. The combination according to claim 16 wherein the article to be monitored is a camera.

18. The combination according to claim 17 wherein the plate assembly comprises a plate defining the first surface and the second surface is defined by a first post projecting in cantilever fashion from the plate.

19. In combination:
a) an article to be monitored having one external surface, another external surface that is transverse to the one surface, and a third surface; and
b) a security assembly comprising:
a plate assembly having a first surface facing in a first direction and abutting to the one external surface on the article to be monitored, a second surface facing transversely to the first direction and abutting to the another external surface of the article to be monitored, and a third surface facing transversely to the first direction and abutting to the third surface on the article; and
a fastener for maintaining the security assembly operatively connected to the article to be monitored,
wherein the article has a bore therein that is threaded and the fastener comprises a threaded element that is threaded into the bore in the article.

20. The combination according to claim 18 wherein there is a second post spaced from the first post and projecting in cantilever fashion from the plate, the second post defining the third surface.

21. The combination according to claim 14 wherein the third surface is an external surface on the article to be monitored.

22. The combination according to claim 14 wherein the first and third surfaces and the another surface face transversely, each to the other.

23. In combination:
a) an article to be monitored having one external surface and another external surface that is transverse to the one surface; and
b) a security assembly comprising:
a plate assembly having a first surface facing in a first direction and abutting to the one external surface on the article to be monitored and a second surface facing transversely to the first direction and abutting to the another external surface of the article to be monitored;
a fastener for maintaining the security assembly operatively connected to the article to be monitored,
wherein the plate assembly comprises a plate defining the first surface and the second surface is defined by a post projecting in cantilever fashion from the plate; and
an elongate, flexible cable connected to and extending from the plate assembly usable to monitor the article.

24. The combination according to claim 23 wherein the post has a cylindrical shape.

25. The combination according to claim 14 wherein the elongate, flexible cable is a metal cable.

26. The combination according to claim 14 wherein the elongate, flexible cable has at least one electrical conductor therein.

27. The combination according to claim 26 further comprising a control unit to which the at least one electrical conductor connects, the at least one electrical conductor defines an electrical path, and the control unit is capable of identifying that the electrical path has been interrupted and causing a detectable signal to be produced indicative that the electrical path has been interrupted.

* * * * *